INVENTOR
JOHN P. MACEK
BY
AGENT AND

ATTORNEY

# United States Patent Office 3,509,892
Patented May 5, 1970

3,509,892
**PROCESS AND APPARATUS FOR
LIQUID LEVEL CONTROL**
John P. Macek, Brooklyn, N.Y., assignor to Pullman Incorporated, Chicago, Ill., a corporation of Delaware
Filed June 26, 1967, Ser. No. 648,794
Int. Cl. E03b 7/07; G05d 21/00
U.S. Cl. 137—9                                                18 Claims

ABSTRACT OF THE DISCLOSURE

An apparatus arrangement and a process for controlling the level of a corrosive fluid in a holding zone comprising passing a non-corrosive diluent such as water through a valve actuated in response to variation in the fluid level and into a diluent conduit terminating in a fixed restriction orifice, providing a fluid withdrawal line from the holding zone in open communication with the conduit for withdrawing fluid in an amount dependent upon the amount of diluent passed through the valve, forming a mixture of diluent and fluid in the conduit and passing the mixture through a fixed restriction orifice and out of the conduit.

---

PROCESS AND APPARATUS FOR LIQUID LEVEL CONTROL

Figure 1:
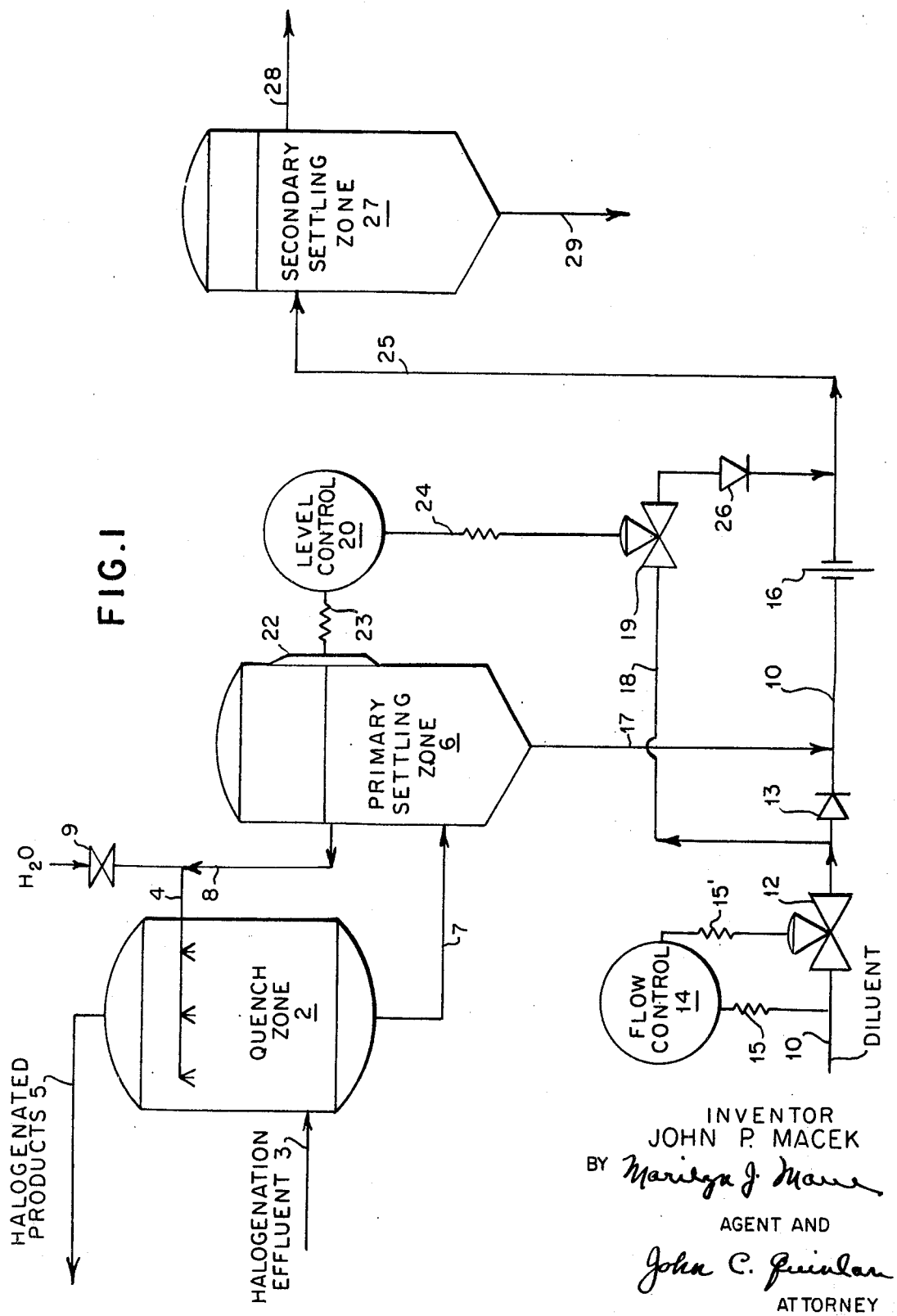

This invention relates to the method and apparatus for controlling the liquid level of liquids, solutions, emulsions or suspensions in a chemical process. In one aspect the invention relates to the method and apparatus for controlling the liquid level of an aqueous acidic suspension containing catalyst solids in a zone of a halogenation process and in a more particular aspect to the method for controlling the liquid level of a dilute aqueous hydrogen chloride suspension containing solids in a settling zone of a chlorination process.

Heretofore, the liquid level of corrosive or erosive fluids in a holding zone of a chemical process has been controlled by withdrawing a controlled amount of the fluid, monitored by a recording flow control device, and passing the fluid through a valve responsive to a level sensing device in communication with the holding zone. The operation is simply that as the liquid level in the holding zone falls below the desired level, the sensing device actuates the valve to restrict the flow of fluid until the desired level is reestablished; whereas when the liquid level rises above the desired level the sensing device actuates the valve to permit increased flow of fluid therethrough until the desired level is reestablished. This operation can be effected in one or a plurality of actuated valved lines. In the case where a plurality of actuated valved lines are employed, the fluids emitted from the valves are usually combined and introduced into a subsequent zone of the process. One of the major disadvantages of these prior methods for controlling liquid level results from the corrosive and/or erosive properties of the fluid which causes frequent replacement of the valves and of the fluid transfer lines. in commercial processes, these valves are expensive items of equipment since they are designed to handle large volumes of corrosive material and each is designed to tolerate a considerable pressure drop across the valve. The frequent blockage or corrosion of these valves in prior continuous processes has resulted in costly interruptions in order to clean and/or to replace equipment. The piping handling the corrosive and/or erosive material is also subject to frequent replacement so that this stage of operation in a chemical process represents a considerable expense contributing to the overall cost and maintenance of the process.

It is an object of this invention to overcome the problems of prior art processes in controlling the liquid level of fluids in a chamber of the process.

Another object of the invention is to eliminate frequent replacement of valves in a chemical process.

Another object of this invention is to minimize conduit replacement in a chemical process.

Another object is to eliminate corosion and/or errosion of actuated valves so that highly sensitive valves can be used to more closely control the liquid level of corrosive liquids in a zone of the process.

Still another object is to provide a process for economically controlling the liquid level of fluid in a zone of a process while simultaneously providing solubilization of solids entrained with the fluid and/or a controlled amount of dilution to the fluid preparatory to a subsequent treatment of fluid in the process.

These and other objects will become apparent from the following description and disclosure.

According to this invention, a noncorrosive and nonerosive liquid or diluent, such as for example, water, enters the level control system and at least a portion of unadmixed diluent is passed through an actuated valve which regulates the volume of diluent in accordance with the variations of fluid level in a holding zone by means of a level sensing control device while the fluid is withdrawn from the holding zone in an amount which varies in correspondence to the variation in the volume of diluent passed through the actuated valve and said withdrawn fluid is then passed through a fixed restriction device in admixture with at least a portion of the diluent which enters the system. In this way, contact of the actuated valve with corrosive and/or errosive fluid is avoided.

In one embodiment this improvement is effected by providing a diluent feed conduit having a restriction device, such as a fixed restriction orifice, at the outlet end of said conduit and an inlet valve, preferably of fixed flow capacity controlled by an inlet flow meter, at the inlet end of said conduit; establishing a flow of diluent through the inlet valve and into the diluent feed conduit; introducing corrosive and/or erosive fluid from a holding zone into diluent passing through the diluent feed conduit by means of a fluid withdrawal line terminating in, and in open communication with, said conduit and passing said corrosive and/or erosive fluid in mixture with diluent through the fixed restriction orifice at the outlet end of said conduit; maintaining a fluid head pressure in the holding zone such that at least some fluid is continuously passed into the diluent feed conduit; providing a diluent by-pass line in open communication with the diluent feed conduit at a point between the inlet valve and the introduction of fluid from the withdrawal line; preventing backflow of fluid in the diluent feed conduit by means of a check valve, solenoid valve, main flow controller or any other suitable device preferably located at a point between the diluent by-pass line and the point of fluid introduction into the diluent feed conduit; and passing a portion of unmixed diluent, introduced from the inlet flow meter, into the by-pass line, through a by-pass valve actuated by a level sensing control device which is responsive to variations of the fluid level in the holding zone and which regulates the volume of diluent permitted to flow through the by-pass valve in accordance with the degree of variation from the desired liquid level. The unadmixed diluent passed through the by-pass valve can be admixed with the diluted fluid on the exit side of the fixed restriction orifice when it is desirable to further dilute the fluid.

In an alternate embodiment of the present process, the improvement is effected by providing a diluent feed conduit having a restriction orifice at its outlet and, at its inlet, an actuated valve responsive to a level sensing control device which registers variations of fluid level in a fluid holding zone which deviate from the level desirably maintained; monitoring the flow of diluent through the actuated valve and into the diluent feed conduit; introducing corrosive and/or erosive fluid from the holding zone into the diluent passing through the diluent feed conduit by means of a fluid withdrawal line terminating in, and in open communication with, said conduit whereby the volume of fluid withdrawn is automatically controlled by the fixed restriction orifice and the volume of diluent passed into the conduit by the actuated valve, preventing back-flow in the conduit by means of a check valve upstream of fluid introduction; and passing the resulting mixture of fluid and diluent through the fixed restriction orifice. If desired, for additional dilution or temperature control of the resulting mixture, a supplementary diluent feed stream can be added either to the mixture or to the diluent prior to mixture with fluid.

It is to be understood that modifications can be made in either of the above described embodiments. For example, a plurality of conduits having fixed orifices can be employed to throttle the fluid-diluent mixture should one of the orifices become plugged or require replacement. Also a plurality of diluent by-pass lines having actuated valves can be employed, if desired. A further modification of the latter arrangement is the use of a diluent by-pass line for each phase of a multiphase fluid mixture in a holding zone wherein each by-pass valve on each line is individually actuated in accordance with level variations of the fluid with which it is associated by means of separate level sensing controls. This method calls for fluid withdrawal means and diluent conduits for each fluid phase having a controlled level. Many other modifications and variations of the present process will become apparent from the following description and disclosure.

The principle upon which the present process operates is hydraulic control. For example, when the liquid in the holding zone drops below the desired level, the by-pass valve on the diluent by-pass line is actuated to decrease the amount of diluent flowing therethrough in accordance with the degree of deviation from the desired liquid level as registered by the sensing device. Since the amount of diluent flowing through the by-pass line is decreased, the amount of diluent forced to pass through the diluent feed conduit, in mixture with fluid, is accordingly increased; and consequently the amount of fluid withdrawn from the holding zone is correspondingly decreased so as to maintain the fixed flow of liquid established by the restriction orifice and the inlet flow controller operating the inlet valve. This hold up of fluid effects the recovery of the desired liquid level in the holding zone as registered by a set point of the sensing device and the sensing device then adjusts the by-pass valve to resume normal flow of diluent therethrough. Conversely, when the liquid level in the holding zone rises above the predetermined level, the by-pass valve through which diluent is passed is actuated to increase the flow therethrough in response to the level sensing control device; the amount of diluent passing through the diluent feed conduit in admixture with the fluid is accordingly decreased and consequently, the amount of fluid withdrawn from the holding zone is increased to maintain the flow rate determined by the inlet valve and the restriction orifice. This increased withdrawal of fluid from the holding zone effects the recovery of the desired liquid level as registered by the set point of the sensing device. Upon recovery of the desired liquid level, the sensing device adjusts the by-pass valve to resume a normal flow of diluent therethrough. In this way, none of the fluid withdrawn from the holding zone passes through the actuated valve and only that portion of the piping which carries the corrosive or erosive material must be especially treated for resistance to corrosion and/or erosion.

In the present process, the level sensing control device actuating the actuated valve and responsive to variations in the liquid level of the primary zone, may be a float, a radioactive sensor, a device operated by differential pressures using an inert or diluent gas or liquid compatible with the system, an electronic switch, or any other device suitable for registering variations in liquid level in a zone of a process. In a specialized embodiment of this process, for close and more immediate control of the liquid level in a holding zone or settling zone, the level sensing control can be connected to a standpipe into which the settler fluid overflows. In this case the level in the settling zone would be controlled by overflow and the standpipe would absorb the shocks of level fluctuations.

The actuated valve which is actuated by the level sensing device can be a pneumatically operated valve, an air valve, a hydraulically operated valve, or, in cases where the level sensing control device is an electronic switch, it can be an electrically controlled valve or any other device suitable to regulate the flow of diluent therethrough in accordance with the level sensing control.

The range of pressure drop across the actuated valve or actuated by-pass valve is between about 0.2 atmospheres and several hundred atmospheres, preferably between 2 and 50 atmospheres. However, the pressure drop depends mainly upon the degree of variation in the liquid level and operating pressure in the holding zone which is generally between about atmospheric pressure and about 100 atmospheres or higher. Nevertheless, it is to be understood that successful application of the process of the present invention does not depend upon the operating pressure in the holding zone.

The restriction orifice is designed to pass diluted fluid at a rate greater than the rate of fluid introduced into the holding or primary zone, which is approximately the amount of fluid introduced into the holding zone and the amount of water necessary to maintain the fluid at a desired dilution and temperature. Generally, the orifice is not more than twice the size necessary to pass fluid at the same rate introduced into the holding zone. The pressure drop across the orifice is generally within the ranges set forth above for the actuated by-pass valve, although a higher or lower pressured drop can be taken in accordance with the requirements of the process and the need for dilution. If desired, the orifice can be replaced by a preset valve, or a plurality of such valves and/or orifices. The advantage of employing a plurality of lines containing diluent and fluid, each having a fixed restriction orifice, or preset valve for passing the diluted fluid, is for convenience in cleaning or replacing one of the orifices or valves without interrupting operation. Also, as a safety measure, if the actuated valve should fail, the plurality of fixed orifice or preset valve lines can provide a temporary means of level control by manually monitoring fluid through one or more of the lines provided. It is to be understood that other safety devices, such as a safety alarm on the level sensing device and automatic shut off means can also be employed in the operation of the process, if desired.

The inlet flow control valve can be manually set or can be automatically operated in response to a flow meter adapted to prevent surge feed.

The minimum volume of diluent introduced through the flow control valve, in the process where the diluent by-pass line is employed, corresponds to the maximum volume of the actuated by-pass valve plus the minimum dilution volume desired to maintain the temperature of the fluid at a certain level, e.g. below the flash point in the lines conducting fluid to the restricted orifice. The preferred diluent input volume is: $d \cdot n +$ excess of minimum of dilution to prevent flashing: wherein $d$ is the fixed orifice volume capacity and $n$ is a value between 1 and 3 or higher depending upon the ultimate fluid dilution or cooling desired. When no cooling or dilution of the fluid is required, $n$ can be 1 or less and the diluent from the exit side of the actuated by-pass valve can be discarded or sent to another stream of the process where needed. Also, in this case, where no minimum dilution is required and diluent from the actuated by-pass valve is discarded, the by-pass line can be eliminated and the actuated valve can be placed on the main diluent feed conduit prior to introduction of the fluid. When a fixed flow of diluent is desirable, a three way valve, designed to pass out of the system excess diluent (i.e. diluent not required to dilute or to regulate the amount of fluid withdrawn), can be advantageously employed. However, when dilution is required, the actuated valve on the main diluent feed conduit which replaces the flow controller and throttles diluent feed through the diluent feed conduit in accordance with level variations is used with a supplementary diluent supply when the throttled amount of diluent is insufficient to provide the dilution desired. While the ratio of diluent to fluid introduced into the system depends on the needs of the process to which this invention is applied, (e.g., the degree of dilution required, solvent action desired of the diluent, temperature control of the withdrawn fluid, etc.) the ratio is preferably between about 0.5:1 and 5:1.

If desired, in cases where it is necessary to control the temperature of the withdrawn fluid below a certain temperature, e.g., below its vaporization temperature, a temperature recorder control can be used in the withdrawal line to adjust the temperature of the cooling diluent from the inlet valve or to supplement the amount of cool diluent from the inlet valve with additional diluent from a colder source.

The diluent passed into the system through the flow control valve is preferably water. However, any liquid diluent which is non-corrosive and compatible with the fluid in the holding zone can be used, such as benzene, cyclohexane, xylene, hexane, octane, and others to totally or partially replace water. In some processes, when it is desirable to dissolve the solids of a fluid suspension, before passing the fluid to a subsequent zone of the process, as in the case of the aqueous hydrogen chloride solution from a halogenation process containing cuprous chloride solids where the diluent is gaseous oxygen the gas may partially or totally replace water; however, means are provided to prevent backflow of gas in the fluid withdrawal line. Also, in the case of polymer slurries in some polymerization processes, e.g., the polymerization of phenol, or phosgene and 2,2-bis(4-hydroxyphenyl)propane to form polycarbonate by a stirred interfacial system in water and dichloromethane, a non-corrosive solvent suitable for this purpose, may be used as diluent, such as, for example, acetone, anhydrous dichloromethane, etc.

The holding zone or primary zone of the present invention can represent a reaction zone, a settling zone, a washing zone, or any other zone in any process wherein it is desirable to maintain a fixed liquid level of a corrosive and/or erosive fluid. For purposes of illustration and for simplicity in the subsequent discussion, the following description is particularly drawn to the operation between a primary and a secondary settler in a halogenation process wherein hydrocarbons are halogenated in the presence of fluid bed supported metal halide catalyst, in the presence of halogen and wherein the product is recovered as a gas and the catalyst support is recovered by settling solids from the resulting aqueous hydrogen halide suspension. In this halogenation process the aqueous acidic effluent from the reactor is quenched with water, the resulting acidic suspension is passed to a primary settling zone where partial settling takes place, the partially settled fluid is then passed to a secondary settling zone wherein the acidic fluid containing solids is again diluted in order to further reduce the temperature of partially settled fluid, and solids are again allowed to settle from the acidic water in the bottom of the secondary settler from which solids are withdrawn and recovered.

The amount and temperature of water introduced through the flow control valve depends primarily upon the cooling required between the primary and secondary settling zones and upon the ultimate dilution of the corrosive fluid desired in the secondary settling zone. In the case of the aqueous hydrogen chloride suspension containing solid support particles, the temperature required is that necessary to maintain the fluid below its flashing temperature, which is between about 200° F. and about 375° F., at pressures ranging from atmospheric to about 15 atmospheres.

It will become apparent that the present invention can be applied to other stages of the halogenation or other chemical processes. For example, the present process for level control is useful in maintaining a desired liquid level in an isoparaffin alkylation reactor, where the reactor effluent is an emulsion of sulfuric acid and hydrocarbon and where the emulsion is passed to a quiescent zone for settling of the acid phase. In this case, the alkylation reaction zone can be considered the primary zone of the present process and the alkylation settler can be considered the secondary zone. The fluid in this case would be the alkylation emulsion, and since water is useful in providing a better acid-hydrocarbon separation, water can be used as the diluent, although isoparaffin can replace water in this operation if desired. The control of liquid level in the reactor prevents flood conditions in the chamber or various chambers of the reactor. Normally in alkylation, the spent acid removed from the lower portion of the settling zone as an aqueous acid phase is passed to a water wash tower where the acid is diluted with water and heated to remove small amounts of organic material from the acid. Since the alkylate product is continuously removed in a hydrocarbon phase which overflows from the upper portion of the settling zone, it is important to maintain the aqueous acid phase in the settler at a level safely below the hydrocarbon-acid interface. This can be accomplished in an economical and commercially feasible manner by application of the process of the present invention for maintaining the liquid level of acid in the settler.

The following drawings illustrate schematic designs of the present process and illustrate some of the embodiments which are discussed above. It is to be understood, however, that the drawings and accompanying description are to be considered in no way limiting to the scope of the present invention.

FIG. 1 illustrates control of the liquid level of an aqueous hydrogen chloride solution containing solid catalyst particles in a primary settling zone. In accordance with this design, the effluent from a halogenation reactor containing halogenated products and an aqueous hydrogen chloride suspension of metal chloride supported on alumina particles is passed at a temperature of 750° F. into quench zone 2 by means of line 3. In the quench zone, the temperature of the effluent is lowered to 265° F. by means of a water wash directed downwardly in the quenching zone from line 4. The cooling of the effluent and the water wash serves to separate the halogenated products which are withdrawn as a gaseous phase by means of line 5 for further treatment in their recovery and refinement. The water washed acidic suspension is withdrawn from the lower portion of the quenching zone and carried to the primary settling zone 6 by means of line 7. In settling zone 6 the metal chloride particles are allowed to settle to a dense slurry or acidic fluid phase in the lower portion of the settling zone. If desired, the supernate (acidic water) can be withdrawn at a fixed rate from the upper portion of zone 6 and pumped to quench zone 2 by means of valved line 8 to supplement the water wash entering the system through valved line 9.

A diluent such as water or another noncorrosive liquid which is compatible with the halogenation reactions, such as hexane, enters diluent feed conduit 10, passing through inlet valve 12 and check valve 13. The flow rate of diluent entering the diluent feed conduit by means of the inlet valve, is controlled by flow meter 14 and control lines 15 and 15′ which actuates valve 12 to emit diluent at a predetermined fixed rate, for example, at a rate of between about 25,000 and about 90,000 pounds per hour per pound of water washed suspension entering the primary settling zone. Check valve 13 is designed to prevent backflow in line 10. A portion of the diluent flows along line 10 to restriction orifice 16 after admixture with fluid withdrawn from primary settling zone by means of line 17. In line 10 the fluid and diluent are intimately contacted before entering restriction orifice 16 where the flow rate is modulated so as to yield a relatively constant flow of diluted fluid.

The remaining portion of diluent is shunted from conduit 10 to bypass line 18 prior to addition of the fluid suspension from zone 6. The diluent in line 18, unadmixed with fluid, passes through control valve 19 which is actuated to permit an increased or decreased volume of flow in accordance with the desired liquid level in primary settling zone 6 by means of level sensing control 20. Level sensing control 20 is adapted to register variations in the liquid level of the primary settling zone by means of a float device 22 communicating with the primary settler and control line 23 and to convert the variation in liquid level to actuate valve 19 by means of line 24 and thereby to permit a greater volume of flow when the level rises and a lesser volume of flow when the level falls in a way such as to exactly compensate for the variation in liquid level. The diluent passed through the actuated valve on bypass line 18 enters line 25 where it is admixed with diluted fluid emitted from the fixed orifice 16. Backflow in line 18 is prevented by means of check valve 26. The combined diluted fluid and diluent is then passed through line 25 into secondary settling zone 27 wherein solid particles are again allowed to settle in the lower portion of the zone and acidic supernate is withdrawn from the upper portion by means of line 28. The solid catalyst support particles are recovered by means of line 29 for further treatment before recycle to the halogenation reaction zone.

It will be apparent from the above description that the level control system of this invention can be also applied to the secondary settler or to other stages in the process such as the quenching zone, or any of the subsequent halogen product treating zones wherein control of the liquid level is desired and is carried out in the manner outlined above.

Figure 2:
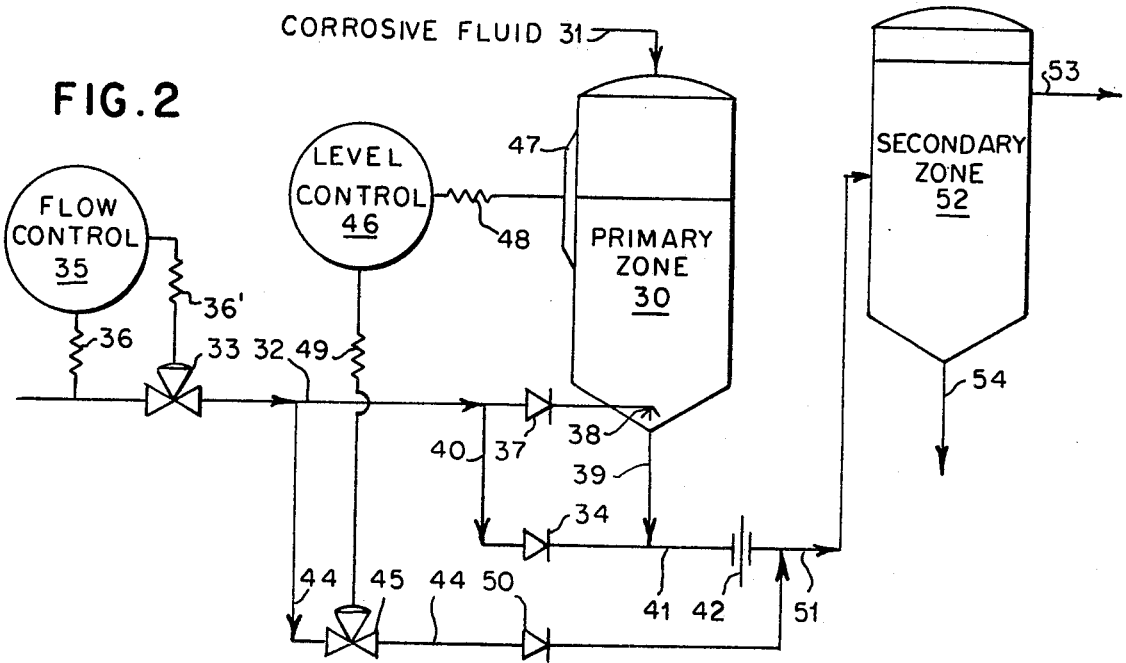

The operative steps illustrated in FIG. 2 are similar to those described in FIG. 1, except that at least part of the diluent is mixed with the fluid in the lower portion of the primary zone prior to fluid withdrawal. This embodiment can be beneficially employed when the fluid slurry is so dense that it would present a danger of plugging in the withdrawal line if not diluted.

According to this embodiment the corrosive fluid containing solids enters primary zone 30 by means of line 31. The solids are allowed to settle to the bottom of the zone to form a dense fluid phase. The diluent enters diluent feed conduit 32, passing through inlet valve 33 and check valve 34. The flow rate of diluent entering the conduit by means of inlet valve 33, is controlled by flow meter 35 and control lines 36 and 36' which cooperate to actuate valve 33 and emit diluent at a predetermined fixed rate, equivalent to that set forth in the embodiment of FIG. 1. As in FIG. 1, check valve 34 is designed to prevent backflow through line 32. A portion of the diluent, preferably a major portion, flows along line 32 and is split into two streams. The first stream flows through check valve 37 and line 38 and is sprayed into the bottom portion of primary zone 30 for fluidization of the solids therein. The fluidized fluid containing solids is withdrawn from zone 30 by means of withdrawal line 39. The second stream of diluent, which by-passes zone 30, enters valved line 40 and passes through check valve 34, is mixed with the fluidized fluid containing solids in line 41 and the resulting diluted mixture is passed through fixed orifice 42.

The remaining portion of diluent passed through inlet valve 33, or a third diluent stream, is shunted from diluent conduit 32 into by-pass line 44. The diluent flows through actuated valve 45 on line 44 which is actuated to permit an increased or decreased volume of flow in accordance with the desired liquid level in the primary zone by means of level sensing control 46. The level sensing control 46 responds to changes in the liquid level of zone 30 by an impulse sent from level measuring means 47 which transmits the level variation to level sensing control 46 by means of control line 48. The level sensing control 46 then responds to the degree of change in liquid level by actuating valve 45 through control line 49. The regulated amount of the third diluent stream leaving control valve 45 is then passed through check valve 50 and is admixed with diluted fluid containing solids emitted from restriction orifice 42 in line 51. The resulting liquid mixture from lines 41 and 44 flows from line 51 to secondary zone 52 wherein the solids are again allowed to settle from the aqueous mixture. The supernate is recovered from the upper portion of zone 52 by means of line 53 and the solids are recovered from the lower portion of zone 52 by means of line 54.

Figure 3:
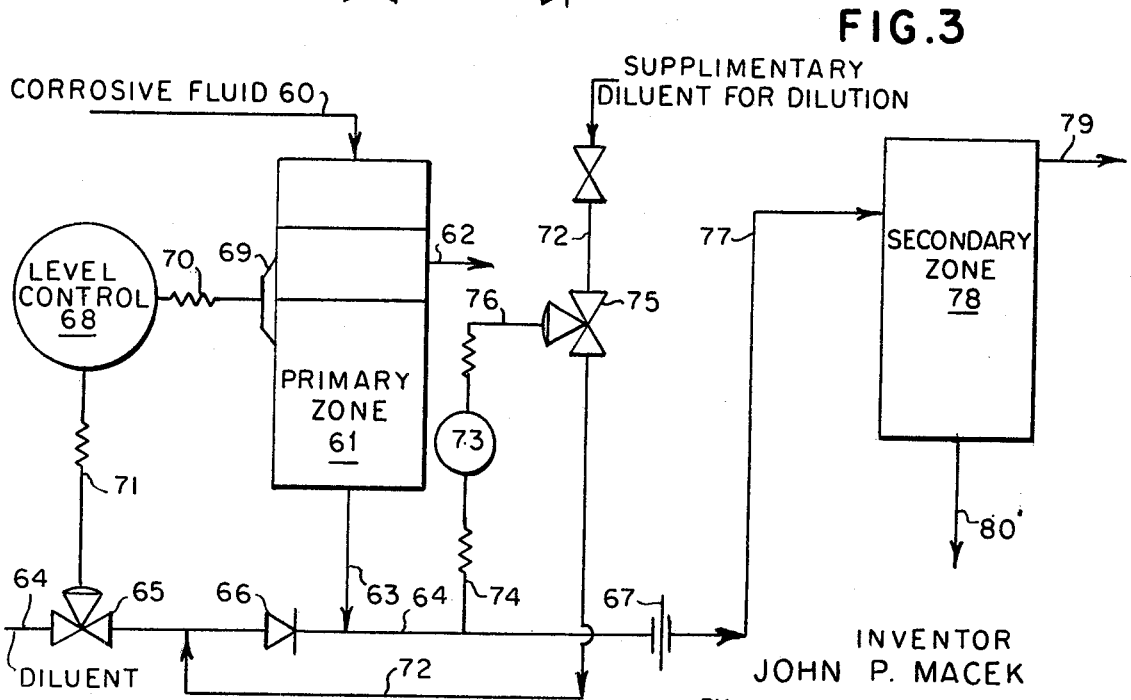

FIG. 3 describes an embodiment of the present invention wherein the diluent by-pass line is omitted and the liquid level is controlled without contacting the actuated valve with corrosive fluid. This arrangement, however, has the disadvantage of being unable to insure a required dilution of the corrosive fluid unless supplementary measures are taken to provide diluent in whatever amount is required for dilution. Because of this drawback, this method is preferably employed in cases where no dilution is required. However, the method can be adapted to dilution requirements, as shown in the following embodiment of FIG. 3, by providing one or more supplementary diluent feed lines independent of the feed diluent monitored through the valve actuated by the level sensing control device.

In this embodiment a corrosive emulsion fluid, such as 94 percent sulfuric acid solution containing isoparaffin, normal paraffin and octanes such as the emulsion mixture withdrawn from a typical alkylation reaction zone, is passed to primary settling zone 61 by means of line 60. In the primary settling zone 61 the emulsion is separated into a hydrocarbon phase and an aqueous acid phase at a temperature of about 150° F. The hydrocarbon phase is withdrawn from the upper portion of the primary zone by means of line 62 for customary separation and refinement of alkylate. A desired liquid level of the lower acid phase is maintained in zone 61 by application of the present invention. The aqueous acid phase still containing some hydrocarbon (about 5%), and having a flash temperature of about 220° F., is withdrawn from the bottom of zone 61 by means of line 63 as the corrosive fluid. A portion of this acid can be recycled to the alkylation reaction and another portion treated for purification if desired, or the entire portion, as in this embodiment, can be treated for purification.

Water diluent is introduced into diluent feed conduit 64, passed through actuated valve 65 and check valve 66. The diluent from check valve 66 continues to flow through line 64 is mixed with the fluid or acid solution withdrawn from zone 61 by means of withdrawal line 63 and the resulting diluted fluid is passed to fixed orificce 67. Valve 65 is actuated to permit an increased or decreased volume flow of diluent in accordance with the fluctuations from the desired liquid acid level in settling zone 61 by means of level sensing control device 68. The level sensing control device 68 is adapted to register variations in the liquid acid level of zone 61 sensed by means of sensing 69 and transmitted to control device 68 through control line 70. The level variations is exactly compensated by an inverse proportion of diluent feed permitted to pass through valve 65 which is actuated by control line 71 connecting level sensing control 68 with valve 65 is proportionately decreased with the rise in liquid level in zone 61 and is proportionately increased with the fall in liquid level.

Because of the exothermicity of adding water to sulfuric acid and because in this embodiment zone 61 is maintained at a temperature close to the flashing temperature of the aqueous acid-hydrocarbon solution, a valved supplementary diluent feed line 72 is provided for adding a controlled amount of water at a substantially low temperature to maintain the aqueous acid withdrawn in line 64 to a temperature below its flash point. This supplementary diluent feed line insures against flashing of the aqueous solution when the volume flow through valve 65 is decreased and the fluid withdrawn in line 63 is consequently increased.

For close control of the temperature requirements, a temperature recorder control can be used on line 72 to monitor the amount of supplementary diluent added to aqueous acid witdrawn in accordance with cooling requirements. In this case temperature recorder control 73 measures the temperature of the diluted fluid in line 64 by means of control line 74 and actuates supplementary inlet valve 75 by means of control line 76 so that when the temperature of the fluid in line 64 rises to an undesired level, valve 75 is opened to permit flow of cold diluent as an additional diluent supply, into line 64 by means of line 72. Conversely, after the temperature in line 64 is lowered to a safe level, the valve can be closed and the supplementary addition of diluent discontinued or, preferably only a purge amount of supplementary diluent is permitted to pass into line 64. In FIG. 3 the addition of supplementary diluent enters line 64 at a point upstream of check valve 66; however, the addition at this point is optional if a check valve is employed on line 72 immediately prior to the point of addition.

The diluent in the supplementary diluent feed line may be water at a substantially lower temperature than water diluent in line 64 or the diluent can be a hydrocarbon diluent such as isoctane which is compatible with the corrosive fluid mixture and which is not corrosive to valve 75.

The aqueous acid solution, diluted by one or more diluent streams, is passed through restriction orfice 67 into line 77 and is passed to a secondary zone 78, or fractionation or flash tower wherein the remaining hydrocarbons are distilled and removed as a gaseous effluent by means of line 79 from the upper portion of zone 78. The decontaminated acid solution is recovered as a liquid effluent from the lower portion of zone 78 by means of line 80. If desired, the aqueous acid free of hydrocarbon contamination, can be reconcentrated, for example by vaporization.

In the above alkylation, the main stream of water diluent passing through actuated valve 65 can be substituted totally or in part by a paraffin hydrocarbon in cases where the acid emulsion contains no ester or sulfide contaminants which tend to degrade alkylate or higher alkylation. With total substitution of the water, exothermic heating of the sulfuric acid solution is avoided and the temperature recorder control arrangement involving valve 75, recorder 73 and control lines 74 and 76 can be omitted. This arrangement can also be omitted when the primary settling zone 61 is operated at a temperature safely below the flash temperature of the corrosive fluid mixture or when it is not necessary to further dilute or cool the corrosive fluid in the diluent feed conduit.

Although the above embodiment is particularly applicable to alkylation processes wherein an emulsion of hydrocarbons and sulfuric acid is passed to a settling zone and then to a fractionation or flashing zone to complete the separation of acid from hydrocarbon, it should be apparent that this schematic design may also be employed in the halogenation processes described in FIGS. 1 and 2 above.

In the above discussion of FIGS. 1, 2 and 3, it is to be understood that sensing means 22, 47 or 69; level sensing controls 20, 46 and 68; and actuated valves 12, 19, 33, 45, 65 and 75 can be any of the devices set forth as equivalents in the foregoing description and that the invention is applicable to many other processes where it is desirable to maintain a certain level of corrosive and/or erosive fluids in any type of treating zone.

The following example, describing the quenched effluent from a halogenation process, is presented for the purpose of illustrating a specific and detailed embodiment and a clearer understanding of the present invention and is not to be considered in any way limiting to the scope of the invention described herein.

EXAMPLE

In this example methane is chlorinated at a temperature of about 750° F. to produce a mixture of chloromethanes, in the presence of hydrogen chloride, oxygen and a fluid bed of metal chloride catalyst solids (supported on alumina). The reactor products and unreacted materials are withdrawn and quenched with water in a quench tower to cool the reactor effluent to 300° F. In addition to cooling, the quench water absorbs unreacted hydrogen chloride and scrubs out solid particles entrained in the reactor effluent product to provide an aqueous acid suspension layer. The chlorinated products are separated from the aqueous layer and recovered as products of the process; while the aqueous acid layer containing solids is passed to a primary settling zone wherein the solids are permitted to settle to a dense phase (i.e. acidic fluid slurry) in the lower portion of the primary settling zone. The supernate acidic water is recycled from the top of the primary settler to the quench tower, although the recycle may be omitted if desired. The fluid slurry, containing acidic water and the settled solids flows from the bottom of the primary settler into a fluid withdrawal line at a temperature of 300° F. The aqueous solution under a pressure of 150 p.s.i.g. contains about 10 weight percent of hydrogen chloride and 1,000 pounds of solids in 10,000 pounds of aqueous solution at 300° F. It is desired to pass this fluid into a secondary settler maintained at 126° F. under atmospheric pressure.

In the primary settler having a height of 29 feet and a diameter of 9.5 feet, it is desirable to maintain a corrosive fluid level of 23 feet. The corrosive fluid containing 10 weight percent solids is continuously withdrawn from the bottom of the settling zone at a temperature of 300° F. at an average rate of 11,000 lbs./hr. which rate varies between 8,000 lbs./hr. and 13,000 lbs./hr. during operation in accordance with the fluctuations in fluid level. It is the aim of this embodiment to control the liquid level in the primary settling zone without passing the corrosive and erosive fluid through expensive valve equipment. It is also desirable to cool and depressurize the corrosive fluid containing solids and to prevent flashing of the fluid before it is introduced into a secondary settling zone operated at atmospheric pressure and a temperature of about 126° F.

In accordance with the arrangement shown in FIG. 1 of the drawings, a fixed flow of 40,000 lbs./hr. of cooling water at 75° F. is introduced into the diluent feed conduit through the valve operated by the recording flow controller. The water is then passed through a check valve provided to prevent liquid backflow in the diluent feed conduit. An average of 21,000 pounds/hour of cooling water is passed through the by-pass line and through the level control valve actuated by the level sensing control device. During actual operation the amount of water passing through the by-pass line varies between about 18,000 and about 23,000 pounds/hr. The remaining portion of cooling water (an average volume of about 19,000 pounds per hour) is mixed with the corrosive fluid passed to the diluent feed conduit from the fluid withdrawal line. The suspension fluid is cooled and the resulting diluted mixture is passed to the restricted orifice at a temperature of about 158° F. The restricted orifice is designed to pass suspension fluid at a rate of 30,000 pounds per hour and to maintain a fixed pressure differential of about 130 p.s.i.g. across the by-pass line and fixed orifice conduit. The water which has passed through the actuated valve in the by-pass line, is then admixed with the diluted suspension fluid emitted from the fixed orifice to make up a volume of 51,000 pounds per hour of aqueous fluid at a temperature of 126° F. and the resulting aqueous suspension fluid, at atmospheric pressure, is then passed to the secondary settling zone wherein the suspended solids of the aqueous suspension fluid are again permitted to settle and are recovered from the bottom of this zone. The supernate acidic water is withdrawn from the upper portion of the secondary settler and passed to a lime pit for neutralization.

To test the operability of the liquid level control of this invention, the liquid level in the primary settling zone is permitted to fall to the level of 0.75 foot by discontinuing the introduction of the aqueous acid containing solids. With the lowering of the liquid level, the valve in the by-pass line is actuated to permit a flow of only 10,000 pounds per hour of water therethrough. In accordance with this decrease in flow through the by-pass line, 30,000 pounds per hour of water diluent is passed through the diluent feed conduit in mixture with the fluid thus restricting the amount of fluid withdrawn from the withdrawal line to 0. Generally, in the operation, the liquid level varies not more than several feet, and, under these less severe conditions a minimum or purge flow of fluid, e.g., of at least 5000 pounds per hour is maintained at all times during the operation. The disadvantage of completely eliminating fluid withdrawal is the danger of plugging the withdrawal line so that it would be difficult to renew operation under normal conditions. The extreme variation in liquid level is permitted in this embodiment to test the extent of operability of the level control arrangement.

To test the sensitivity of the level control, the liquid level in the primary settling zone is permitted to fall to a level of 22 feet by reducing the amount of acidic water containing catalyst solids introduced into the settling zone to 8,000 pounds per hour. The lowering of the liquid level is recorded by the level sensing control device which comprises a float arrangement.

The sensing device compensates for the drop in fluid level by automatically restricting the valve to permit a flow of only 17,000 pounds of water per hour therethrough. In accordance with the decrease in flow through the by-pass line, 23,000 pounds per hour of water diluent is forced through the dilutent feed conduit in mixture with the corrosive fluid. Since the restricted orifice is designed to pass 30,000 pounds per hour and since the fixed flow rate permits 40,000 pounds per hour of cooling water to enter the system, the volume of fluid withdrawn from the primary zone and passing into the diluent feed conduit is reduced to 7,000 pounds per hour. The actuated valve throttles the diluent in the by-pass line from 17,000 pounds per hour until the desired liquid level is re-established by the hold up of fluid withdrawn from the primary settling zone at which time a new set of flow conditions are establisehd to maintain the desired liquid level.

To further test the liquid level arrangement of the present invention, the acid solution containing catalyst solids entering the primary settler is increased to 13,000 lbs./hr. to establish a 23.75 foot level (0.75 foot above the level desired). Upon increasing the amount of material introduced into the quenching column it is found that the valve in the by-pass line, responsive to the level sensing device, opens to permit 24,000 pounds of water per hour to pass therethrough in order to retain the pressure differential across the by-pass and the orificed branch lines at about 130 p.s.i.g. This has the effect of decreasing the amount of diluent in the dilutent feed conduit to 16,000 pounds per hour and of increasing the flow of fluid through the withdrawal lie to 14,000 pounds per hour, which immediately drops the liquid level in the settling zone and permits the system to again stabilize itself at the desired liquid level of 23 feet.

Having thus described my invention, I claim:

1. A process for controlling the liquid level of a fluid in a zone which comprises:
    (a) introducing a non-corrosive and non-erosive diluent into a dilutent conduit for mixture with a fluid therein in an amount regulated by a valve actuated by a level-sensing control responsive to variations in the level of the fluid in the zone;
    (b) withdrawing fluid from the zone in a fluid withdrawal line in open communication with the diluent conduit and in an amount compensating for variations from the desired level in the zone and augmenting the amount of diluent passing through the diluent conduit;
    (c) combining withdrawn fluid and diluent in the dilutent conduit; and
    (d) passing said mixture through a fluid restriction device located at the outlet end of said diluent conduit.

2. The process of claim 1 wherein the volume ratio of diluent to fluid is between 0.5:1 and 5:1.

3. The process of claim 1 wherein the diluent is a solvent for the fluid.

4. The process of claim 1 wherein the zone contains a plurality of fluid phases and the level sensing control is responsive to the level of one of the fluid phases.

5. The process of claim 1 wherein the zone contains a plurality of fluid phases and a separate level sensing control is provided for at least two of the fluid phases and each level control actuates a separate valve for regulating the amount of diluent passed through a diluent conduit, separate fluid withdrawal lines are provided for each of the level controlled fluids, and the amount of fluid withdrawn in each withdrawal line corresponds to variations from the desired level and augments the amount of diluent passing through the respective diluent conduit having a restriction device at its outlet.

6. The process of claim 1 wherein the valve actuated by the level sensing control also regulates the volume of dilutent entering the conduit and permits a greater volume of diluent to enter as the level in the holding zone falls below the desired level and a lesser volume of diluent to enter as the level in the holding zone rises above the desired level, and the total amount of diluent is mixed with the fluid which is withdrawn from the holding zone in a volume variation inversely proportional to the variation in the volume of diluent passed through the actuated valve.

7. The process of claim 6 wherein the diluent is water and the fluid is an aqueous sulfuric acid solution which is withdrawn from the holding zone at a temperature close to the flash temperature of the solution and wherein a temperature sensing device responsive to the temperature of fluid in the withdrawal line actuates a valve to permit supplementary addition of cold diluent into the diluent conduit as the temperature in the withdrawal line rises above a temperature set to avoid flashing of the fluid upon dilution in the diluent conduit.

8. A process for controlling the liquid level of fluid in a holding zone which comprises: monitoring diluent through a diluent conduit having a fixed restriction orifice at its outlet, withdrawing varying amounts of fluid from the holding zone by means of a fluid withdrawal line and passing the fluid into the diluent conduit in mixture with diluent, maintaining a fluid head pressure such that a minimum flow of fluid into the diluent conduit is assured; controlling the volume of diluent in mixture with said fluid in accordance with the variation in liquid level in the holding zone by passing a portion of the unmixed diluent, prior to the introduction of fluid, into a diluent by-pass line and through a diluent by-pass valve actuated by the liquid level in the holding zone to pass a greater volume of diluent through the by-pass line when the level rises above the desired level and a smaller volume of diluent through the by-pass line when the level falls below the desired level; said by-pass line being in open communication with the diluent conduit so as to directly increase or decrease the volume of diluent through the conduit in accordance with the volume passed through the by-pass line and thus to indirectly regulate and vary the volume of fluid withdrawn to a volume variation directly proportional to the variations in the volume of diluent passed through diluent by-pass valve.

9. The process of claim 8 wherein diluent is introduced in a volume equivalent to $d \cdot n +$ excess of minimum fluid dilution desired, wherein $d$ is the fixed orifice volume capacity and $n$ is a value between 1 and 3.

10. The process of claim 8 wherein a minimum dilution of the fluid is required which is not provided by the dilution of fluid in the diluent conduit and wherein the diluent passed through the by-pass valve is mixed in controlled amount with the diluted fluid downstream of the restriction orifice.

11. The process of claim 8 wherein a plurality of diluent conduits are employed any combination of which can be in open communication with the diluent by-pass line and the fluid withdrawal line.

12. The process of claim 8 wherein the fluid contains solid particles and wherein a portion of the diluent, prior to the introduction of fluid, is passed into the lower portion of the holding zone to fluidize the dense phase of fluid containing solids prior to withdrawal in the fluid withdrawal line.

13. The process of claim 8 wherein the diluent feed is monitored at a fixed flow rate by a flow control device which actuates a diluent inlet valve at the inlet of the diluent conduit.

14. The system for controlling fluid level in a chamber which comprises in combination: a chamber adapted for containing fluid at a desired level; a diluent conduit having a feed control valve at the inlet end for admitting diluent and a restriction orifice at the outlet end thereof; withdrawal means from said chamber in open communication with said diluent conduit at a point between said inlet valve and said restriction orifice; said withdrawal means operated to pass fluid into the diluent in said diluent conduit at a volume dependent upon the size of the restriction orifice and the amount of diluent passing through said conduit in admixture with said fluid; a diluent by-pass line for controlling the amount of diluent passed through the diluent conduit in mixture with fluid, said diluent by-pass line being in open communication with the diluent conduit and being located upstream of the point of fluid introduction and said by-pass line being adapted by means of an actuated valve to pass an amount of diluent which varies directly in accordance with variations in fluid level in said chamber by means of a level sensing control device which communicates with said chamber and actuates said valve.

15. The system for controlling fluid level in a chamber which comprises in combination; a chamber adapted for containing fluid at a desired liquid level, a diluent conduit having an actuated valve at the inlet end for admitting diluent and a restriction orifice at the outlet end thereof; said valve actuated to pass an amount of diluent which varies inversely with the variations in fluid level in said chamber by means of level sensing control device which measures the degree of variation from the desired liquid level and actuates said valve; withdrawal means from said chamber in open communication with said diluent conduit at a point between said actuated valve and said restriction orifice; a check valve between said actuated valve and said withdrawal means to prevent backflow of fluid in the diluent conduit; and said withdrawal means operated to pass fluid into the diluent in said diluent conduit at a volume dependent upon the size of the restriction orifice and the amount of diluent passing through said conduit in admixture with said fluid.

16. The process of claim 1 wherein a portion of the diluent in the diluent conduit is admixed with fluid in said zone prior to mixing diluent and fluid in said diluent conduit.

17. The process of claim 1 wherein a substantially fixed amount of diluent is continuously introduced through a flow control means and a portion of unadmixed diluent is passed through an actuating valve in a line which bypasses, and which is in open communication with, the diluent conduit, thereby indirectly controlling the amount of diluent passing through the diluent conduit.

18. The process of claim 1 wherein the pressure drop across the actuated valve is between about 0.2 and about 50 atmospheres.

References Cited

UNITED STATES PATENTS

| 2,080,872 | 5/1937 | Paterson | 137—9 |
| 2,166,370 | 7/1939 | Putnam et al. | 137—101.11 |
| 2,212,374 | 8/1940 | Louis | 137—101.11 |
| 2,886,210 | 5/1959 | Cooper et al. | 137—1 X |

WILLIAM F. O'DEA, Primary Examiner

D. R. MATTHEWS, Assistant Examiner

U.S. Cl. X.R.

137—101.25, 386